United States Patent [19]
Reeber

[11] Patent Number: 5,197,775
[45] Date of Patent: Mar. 30, 1993

[54] GLOVE COMPARTMENT

[75] Inventor: Francis G. Reeber, Carleton, Mich.

[73] Assignee: Ford Motor Company, Dearborn, Mich.

[21] Appl. No.: 806,175

[22] Filed: Dec. 13, 1991

[51] Int. Cl.⁵ ............................................. B60R 7/06
[52] U.S. Cl. ................................... 296/37.12; 49/122
[58] Field of Search ............... 296/37.1, 37.5, 37.8, 296/37.9, 37.12; 224/273, 282; 49/101, 109, 114, 122

[56] References Cited

U.S. PATENT DOCUMENTS 1,072,809 9/1913 Baxter ............................... 49/109 X
3,584,413 6/1971 Abrami et al. ..................... 49/114 X
4,355,837 10/1982 Shimizu ............................ 296/37.12

Primary Examiner—Charles A. Marmor
Assistant Examiner—Andrew C. Pike
Attorney, Agent, or Firm—Daniel M. Stock; Clifford L. Sadler

[57] ABSTRACT

A glove compartment includes an upper lid and a lower door operatively connected to open both the lid and the door in response to the opening of the lower door to reduce the package space necessarily provided in a vehicle for a glove compartment closure. A lost motion connection is provided in a linkage operatively disposed between the lid and the door to permit opening movement of the door without corresponding movement of the lid.

8 Claims, 2 Drawing Sheets

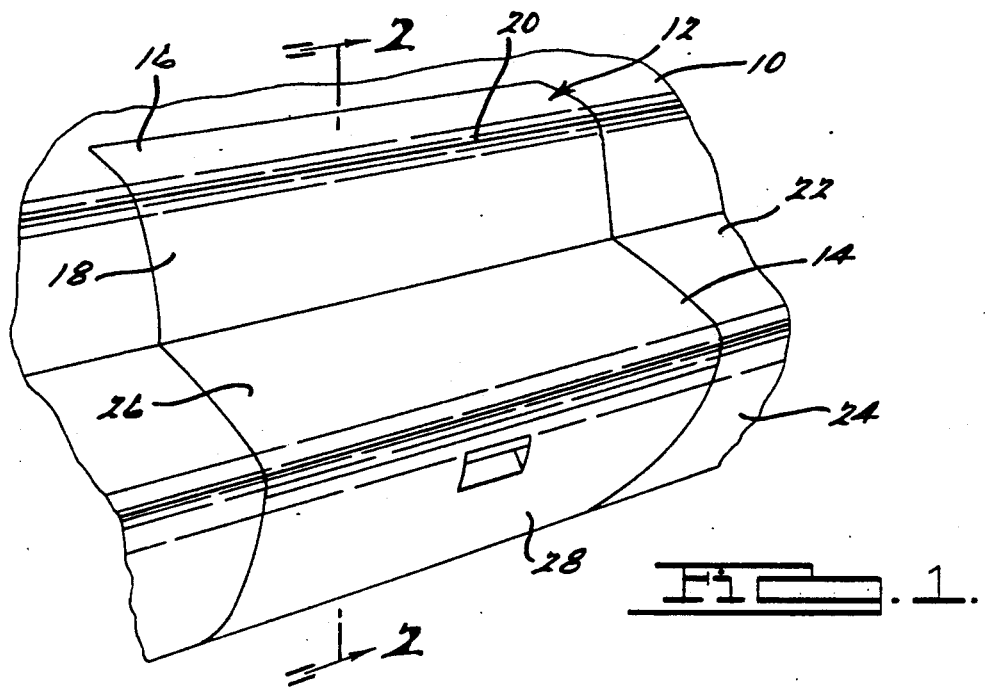
FIG. 1.
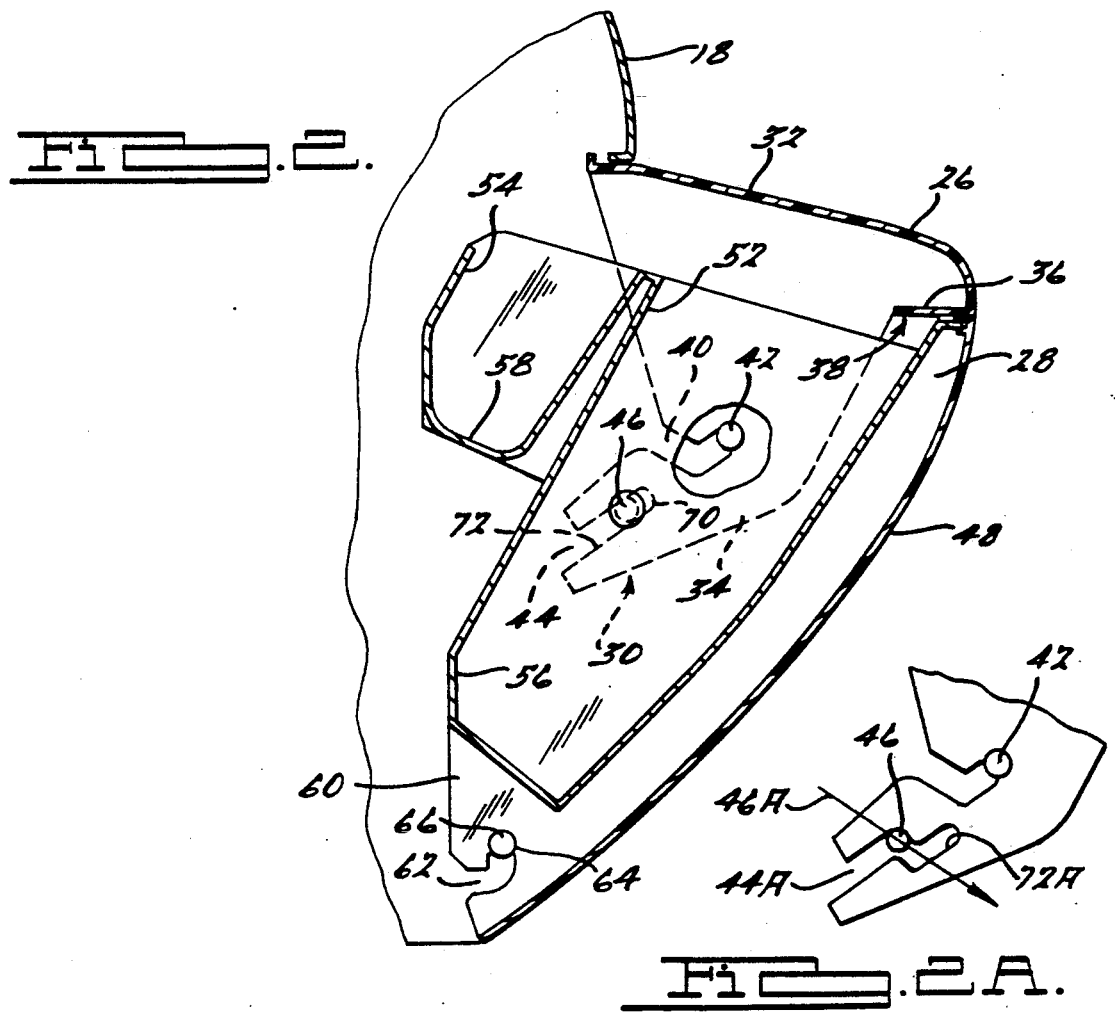
FIG. 2.
FIG. 2A.

GLOVE COMPARTMENT

BACKGROUND OF THE INVENTION

The present invention relates to glove compartments supplied in the instrument panels of automobiles. It is the practice in the design of the interiors of automobiles to provide the storage compartment, or glove compartment, in the automobile's instrument panel on the side of the instrument panel opposite the driver's position. The introduction of inflatable restraints or air bags to the interior design of automobiles has brought new design constraints to the task of packaging a glove compartment of suitable size in the passenger position. It is often desirable to position the air bag assembly at or near the upper surface of the instrument panel. Merely shifting the position of a conventional glove compartment below the air bag assembly may interfere with the leg room afforded a seated passenger in the passenger seating position. In conventional glove compartment design, a door is provided which is hinged along a lower surface for pivotal movement outwardly into the passenger compartment for providing access to the interior of the compartment. This pivotal movement in a conventionally sized glove compartment door may result in interference with passenger leg room when in the open position. Reducing the size of the door, of course, reduces access to the interior of the compartment and effectively reduces its useful size.

One possible way of overcoming this design restraint is shown in U.S. Pat. No. 4,355,837 to Shimizu et al., which provides a glove compartment closed by a pair of doors, one hinged on an upper surface of the instrument panel and one hinged on a lower. Such an approach has a number of disadvantages that make it inappropriate for use in an automobile equipped with a passenger side air bag. One is that the upper door opens vertically upward creating the possibility of interference with the opening of an air bag positioned in this location. Another is that the lower door opens horizontally outward in the form of a desk to intrude into usable space for the seated passenger. Yet another is that the two doors must be opened independently between fully close and fully opened positions, making the use of such a design inconvenient.

SUMMARY OF THE INVENTION

The cited design constraints are overcome and the disadvantages of the prior art are eliminated in the present invention through the provision of a glove compartment for the instrument panel of a vehicle that is positioned vertically below the passenger side air bag, and includes upper and lower hinged doors. The upper door, or lid, has a closed position forming a generally horizontal surface with the instrument panel below the passenger side air bag and is pivotally mounted to it. The lower door is pivotally mounted to the instrument panel and forms a general vertical surface with it and abuts the lid in a closed position to close the glove compartment. A linkage arrangement cooperates between the upper lid and the lower door so that pivotal opening movement of the door effects pivotal opening movement of the lid, the lid moving to a position below the passenger side air bag. A lost motion connection is provided in the linkage so that certain opening movement of the lower door can be accomplished to provide some access to the glove compartment without affecting opening movement of the upper lid. With this glove box construction, convenient access through the opening of the lower door permits insertion or removal of small articles while access to the entire compartment is effected through complete opening. This minimizes intrusion of the glove compartment doors into the passenger leg space. It also permits double door opening without manipulation of more than one door, and the opening path of the upper lid ensures a lack of interference with the path of an opening air bag.

BRIEF DESCRIPTION OF THE DRAWINGS

The features summarized as well as other advantageous features that the glove compartment of the present invention will be appreciated by those skilled in the automotive component arts upon reading the following description with reference to the accompanying drawings in which:

FIG. 1 is a view of a portion of an automobile instrument panel depicting the invention glove compartment positioned below the doors of a passenger side air bag.

FIG. 2 is a cross-sectional view of a glove compartment in the closed position taken along lines II—II of FIG. 1.

FIG. 2A is a partial view of an alternative embodiment of a portion of the linkage of the invention glove compartment.

DESCRIPTION OF THE PREFERRED EMBODIMENT

Figure 3:
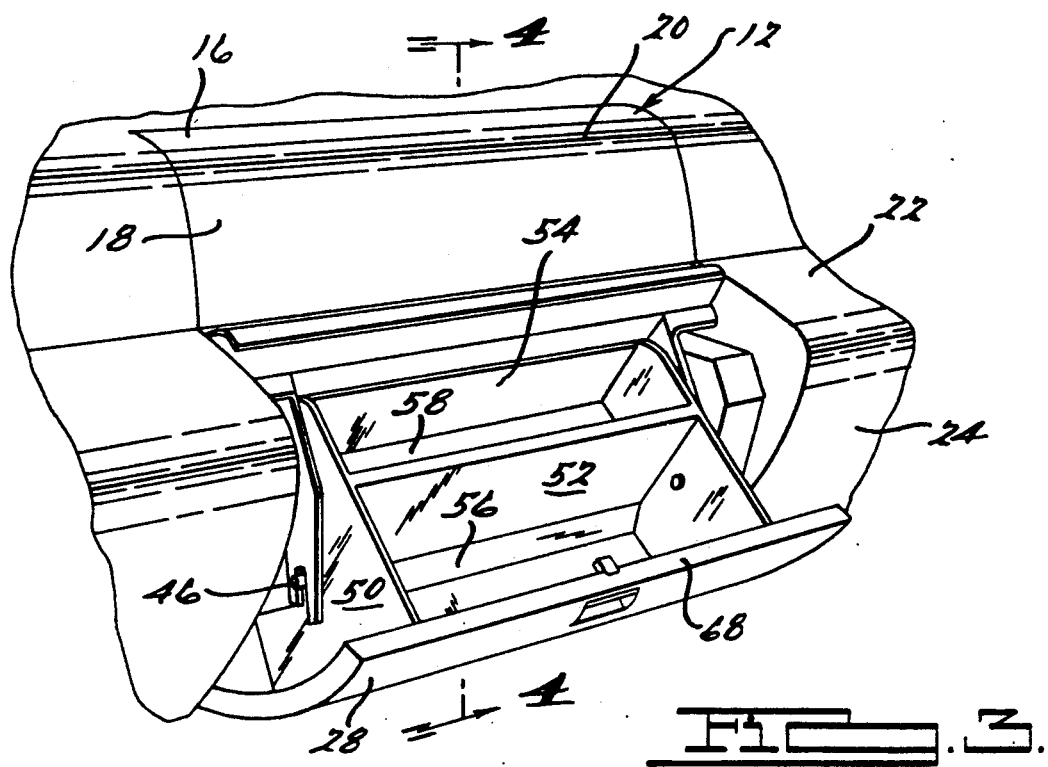
FIG. 3 is a partial view in perspective of the glove compartment of FIG. 1 shown in the fully opened position.

Turning now to the drawings and in particular to FIG. 1, an instrument panel 10 for an automobile is depicted as including an upper passenger side air bag assembly indicated generally at 12 and a glove compartment assembly 14 positioned below the air bag assembly 12. It will be understood that the air bag assembly 12 is of a well-known design which includes upper and lower doors 16, 18 openable about a split line 20 in response to inflation of the air bag to present the inflated cushioning device towards the passenger seated in registration with the air bag assembly 12. The glove compartment assembly 14 is configured to fit in flush relationship with a generally horizontally surface 22 of the instrument panel 10 as well as a generally vertical surface 24.

The glove compartment assembly 14 consists generally of an upper lid 26 and a lower door 28 and linkage means indicated generally at 30 operatively interconnecting the lid 26 and the door 28. The lid 26 is preferably formed as a molded plastic part, which includes a cover portion 32 and a pair of link arms 34. A closure ledge 36 is formed as a turned back portion of the cover portion 32 to present a downward facing surface 38 in the closed position as shown in FIG. 2. A slot 40 is formed in each of the link arms 34 terminating at its inner end in suitable configuration for engaging a mounting pin 42 in snap-fit relationship, the mounting pin being carried in fixed relationship in a portion of the instrument panel 10. A second slot 44 is formed in the end of each of the link arms 34 remote from the cover portion 32 for receiving a pin 46 in pivotal and sliding relationship, the pin 46 being fixedly carried in the lower door 28, as may best be seen in FIG. 3.

The door 28 is formed as a box-like structure from which a pair of side panels 50 extend in perpendicular relationship and has a finish panel 48 attached enabling containment of latching mechanism 68, as well as filler material to protect occupant in the event of collision. The side panels are spanned by cross panels 52, 54 to form a pair of storage compartments 56, 58, respectively. It will be appreciated, however, that the intermediate cross panel 52 may readily be eliminated if not needed for stiffness, to define a large, single storage compartment. The cover 28 also is formed from molded plastic parts and includes linkage arms 60 each pierced by a slot 62, terminating in an inner end 64 configured to receive a pin 66 in snap-fit relationship for pivotal mounting of the door with respect to the instrument panel 10, the pin 66 being fixedly carried on a portion of the instrument panel 10.

Figure 4:
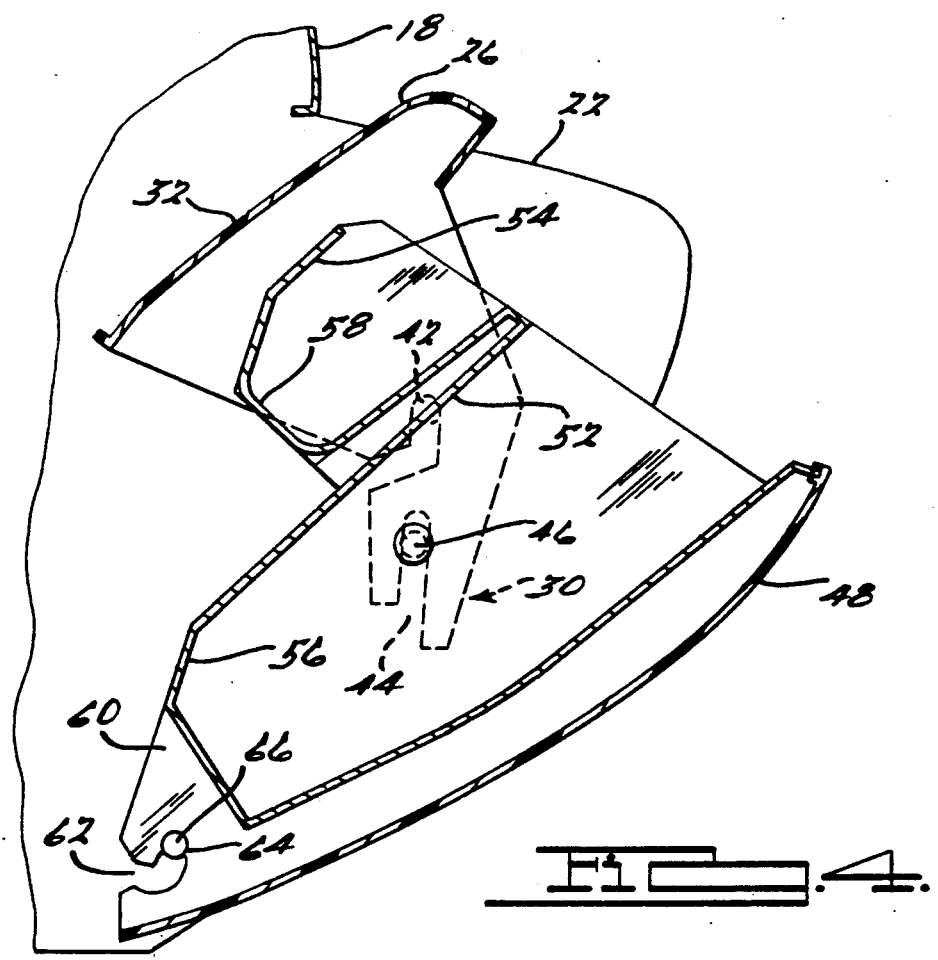
FIG. 4 is a cross-sectional view taken along IV—IV of FIG. 3.

The door 28 also includes a known latch 68 for locking engagement with the lid 26 in a known manner. Referring now to FIGS. 2 and 4, the advantageous operation of the glove compartment assembly 14 of the present invention may be understood. Disengagement of the latch 68 allows pivotal movement of the door 28 about the pin 66. Initial movement of the door 28 effects 46 toward the end 70 of the slot 44, effecting little pivotal movement of the lid 26. As can best be seen in FIG. 2A, a modified slot 44A may be provided that permits movement of the pin 46 in its arcuate path 46A without any movement of the upper lid 26. Significant lost motion relationship can thereby be established. The storage compartment 56 is accessible during this portion of the pivotal travel. Further movement of the door 28 effects engagement of the door carried pin 46 against the forward side 72 of the slot 44 to pivot the lid 26 about the pin 42 to the position shown in FIG. 4, permitting access to both compartments 56 and 58. While only one embodiment of the glove compartment of the present invention has been described, others will be possible without departing from the scope of the appended claims.

I claim:

1. A glove compartment in an instrument panel of a vehicle comprising:
   an upper lid having a closed position forming a generally horizontal surface with the instrument panel and pivotally mounted thereto;
   a lower door having a closed position forming a generally vertical surface of the instrument panel abutting the lid to close the glove compartment and pivotally mounted thereto;
   vertically spaced pin means disposed in said instrument panel;
   lid arms carried with said lid and pivotally engaged with one of said pin means;
   door arms carried with said door and pivotally mounted on another of said pin means; and
   cooperative linkage means disposed between said lid arms and said door arms to effect opening movement of said lid upon opening movement of said door.

2. A glove compartment as defined in claim 1 further comprising:
   lost motion linkage means operatively disposed between said lid arms and said door arms whereby said door may be pivotally moved in an opening direction without opening movement of said lid.

3. A glove compartment as defined in claim 2 wherein said lost motion means comprises:
   a slot defined in at least one of said lid arms and at least one pin fixedly mounted on said door.

4. A glove compartment as defined in claim 1 wherein said lid arms are integrally formed with said lid and are received in snap-fit relationship with said one of said pin means.

5. A glove compartment as defined in claim 1 wherein said door arms are integrally formed with said door and are received in snap-fit relationship with said other of said pin means.

6. A glove compartment as defined in claim 1 wherein said cooperative linkage means comprises a pin and slot interconnection between said lid and said door.

7. A glove compartment in an instrument panel of a vehicle comprising:
   an upper lid having a closed position forming a generally horizontal surface of the instrument panel and pivotally mounted thereto;
   a lower door having a closed position forming a generally vertical surface of the instrument panel abutting the lid to close the glove compartment and pivotally mounted thereto; and
   linkage means operatively disposed between the lid and the door to effect upward motion of the lid toward an open position upon certain downward movement of the door, said linkage means comprising lid arms integrally formed with said lid and received in snap-fit relationship over pins carried in said instrument panel.

8. A glove compartment in an instrument panel of a vehicle comprising:
   an upper lid having a closed position forming a generally horizontal surface of the instrument panel and pivotally mounted thereto;
   a lower door having a closed position forming a generally vertical surface of the instrument panel abutting the lid to close the glove compartment and pivotally mounted thereto; and
   linkage means operatively disposed between the lid and the door to effect upward motion of the lid toward an open position upon certain downward movement of the door, said linkage means comprising door arms integrally formed with said door and received in snap-fit relationship on pins carried in said instrument panel.

* * * * *